Jan. 2, 1968 L. F. COCHRAN 3,360,852

MANUFACTURE OF CERAMIC BASES

Filed May 8, 1964

Inventor
Lawrence F. Cochran
By his attorneys
Howson and Howson

United States Patent Office 3,360,852
Patented Jan. 2, 1968

3,360,852

MANUFACTURE OF CERAMIC BASES

Lawrence F. Cochran, Pittstown, N.J., assignor to Frenchtown Porcelain Company, Frenchtown, N.J., a corporation of New Jersey Filed May 8, 1964, Ser. No. 366,085
2 Claims. (Cl. 29—624)

This invention relates to ceramic bases suitable for mounting electrical circuit elements and in particular to a novel method for making such bases.

The construction and development of miniaturized electronic equipment has expanded greatly in recent years. In this equipment, circuit elements such as transistors are conventionally mounted on ceramic bases having metallized areas designed to be connected to the circuit element and having leads for connection to other elements. Since these bases are small (say .050 to 1.00 inch in diameter, and .005 to .375 inch thick), there is great difficulty in shaping them evenly and in placing the metallized areas and the leads properly. In most instances the bases are circular or rectangular wafers, and in order to insure that they are properly and consistently oriented through the metallizing, lead-connecting and other operations, they are conventionally formed with a short indexing tab or notch at one point on the circumference. This practice has not been satisfactory. The location of the indexing tab or notch on the periphery of the body and its comparatively small size make it difficult to get tabs of consistent size and shape during forming of the ceramic body. Warping of the body during firing is also common. Finally, the tab or notch is not efficient as a means for enabling automatic metallizing and brazing machines to orient the base.

In accordance with the invention, these difficulties are overcome by constructing the bases in groups of two or more connected by a central web. In a particularly preferred embodiment a pair of wafers are connected by a strut to form a kind of dumbbell configuration. This enables the base to be pressed and fired with minimum distortion or unevenness and provides a symmetrical, easily indexed body for metallizing and lead attachment.

The invention thus envisions a method for making miniature ceramic bases for electrical circuit elements which comprises forming a blank from a raw ceramic mix, said blank comprising a web and a plurality of lobes attached to said web, firing said blank, and subsequently severing the lobes from the web.

Figure 1:
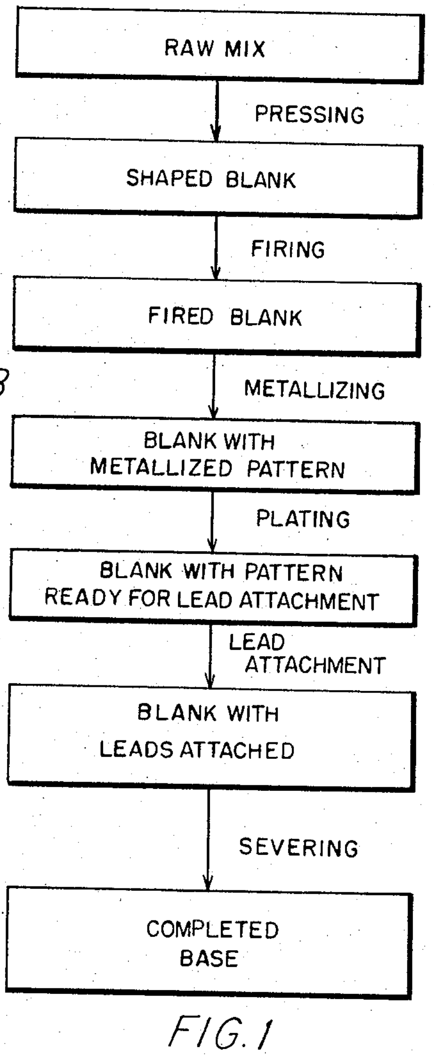
FIG. 1 is a flow diagram indicating the steps which may be used in making a ceramic base, according to the invention.

Referring to FIG. 1, a ceramic base is made according to the invention by first forming a blank from a raw ceramic mix. It will be understood that the chemical composition of the base is not a part of the invention and any of the ceramic compositions conventionally used in the art for electrical bases may be used. Particularly suitable compositions are those disclosed in Patent No. 2,290,107 of Daniel W. Luks, based on the system $Al_2O_3.MnO.SiO_2$.

Figures 2, 3, 4A, 4B, 5A, 5B, 6, 7A, 7B, 7C:
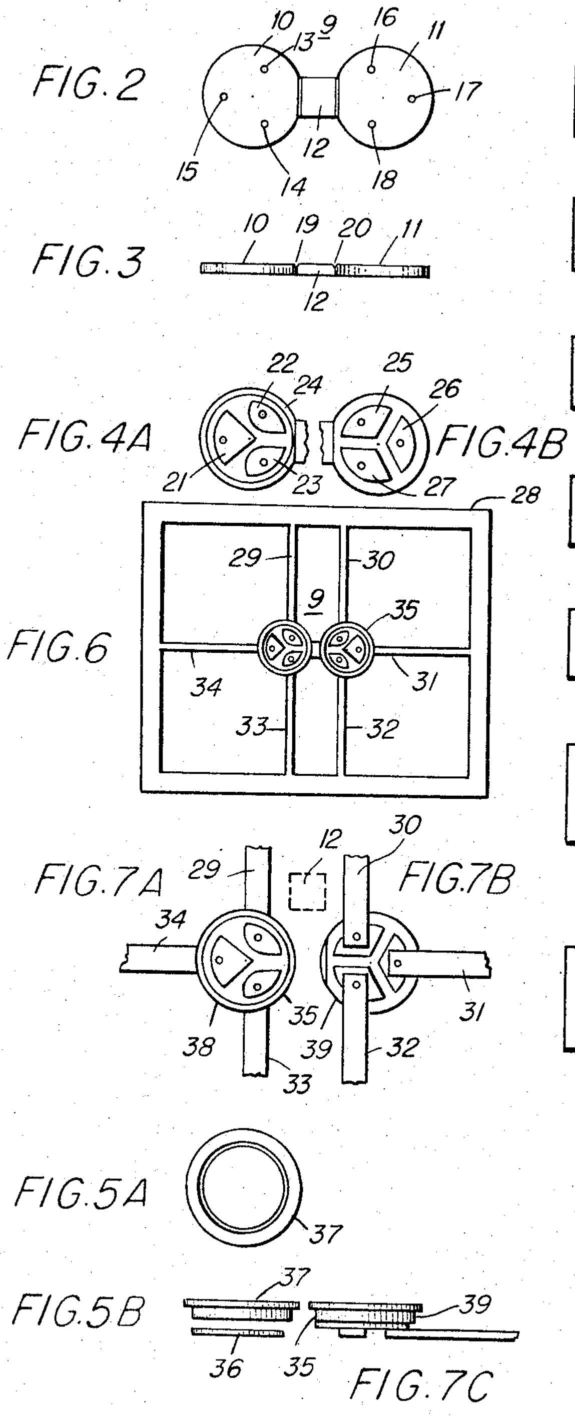
FIG. 2 is a plan view, greatly enlarged, of a preferred form of a ceramic base blank as used in the process of the invention.
FIG. 3 is a view in side elevation of the blank of FIG. 2.
FIG. 4A is a plan view, greatly enlarged, of the upper face of one half of a preferred form of a blank according to the invention after metallizing and plating.
FIG. 4B is a plan view, greatly enlarged, of the lower face of one half of a preferred form of a blank according to the invention after metallizing and plating.
FIG. 5A is a plan view, greatly enlarged, of an eyelet for use in a base made according to the invention.
FIG. 5B is a view, greatly enlarged, in elevation of the eyelet shown in FIG. 5A and a washer for use in conjunction therewith.
FIG. 6 is a top plan view, greatly enlarged, showing the blank of FIGS. 2, 3 and 4, and the eyelet and washer of FIGS. 5A–B assembled on a lead frame.
FIG. 7A is a top plan view of a completed base made according to the invention.
FIG. 7B is a bottom plan view of a base made according to the invention.
FIG. 7C is a view in side elevation of a base made according to the invention.

The raw mix, comprising the principal components, and a plasticizer such as a wax or soap, in finely divided form, is put into a conventional press and presed to form a blank 9. In accordance with a preferred embodiment of the invention, the blank 9 has the form shown in FIGS. 2 and 3, comprising two lobes 10 and 11 joined by a web, in this case a strut 12. As shown in FIG. 2, the lobes 10 and 11 are conveniently circular in outline, but this is not essential to the invention, and in a broad sense, they may be polygonal, the term polygon being used to mean a plane figure having $n$ sides where $n$ is an integer such that $n=3\rightarrow\infty$. Thus when $n$ is three, the figure is a triangle and when $n$ is infinity, the figure is a circle.

The lobes 10 and 11 may conveniently have holes 13 to 18 for the attachment of leads. In FIGS. 2 and 3, there are three holes in each lobe but this may vary; in general there will be one hole for each lead it is desired to attach.

As appears most clearly in FIG. 3, the lobes are divided from the strut by notches 19, 20 which facilitate detaching the lobes from the strut.

The blank, having been shaped, is next fired. The firing conditions will, of course, depend on the specific ceramic composition being used. However, it is one of the advantages of the present invention that the geometry of the blank tends to suppress distortion during firing, regardless of the chemical composition or firing temperature.

After firing, the finished blank is given a metallizing coat. Again, the details of metallizing vary, depending on the use to which the base is to be put. In a typical case, the technique involves preparing a coating liquid or paste comprising a metallic ingredient, a vehicle, a glass frit and a binder, applying the liquid or paste to the ceramic by spray, photo etch, brush or silk screen techniques, drying and firing. Suitable compositions and details of technique are described in Patents 2,848,802 and 2,857,-664. In the particular base illustrated in the drawings there are four metallized areas 21, 22, 23 and 24 on the upper face of each lobe (FIG. 4A), and three metallized areas, 25, 26 and 27 on the bottom face (FIG. 4B). The areas 21, 22, 23, 25, 26 and 27 surround the holes on both sides of the base while the area 24 is a ring around the periphery of the base on its upper face. The function of the metallized areas will become clear from the description to follow.

It will be obvious that in order to position the metallized coatings with precision it is necessary that the base be properly oriented. This is not a simple matter, especially if the coating is to be applied by an automatic silk screen machine. However, the peculiar shape of the blank made in accordance with the invention enables this otherwise difficult task to be accomplished with comparative ease.

After metallizing, the base may, if desired, be plated on the metallized areas to provide a more perfect surface for attaching leads. Whether or not a plating step is employed will in general depend on the nature of the metallizing step. Following this the leads are attached.

A convenient way to connect leads to the base is illustrated in FIG. 6. As shown in that figure, a frame 28 is provided having lead members 29 to 34 extending inwardly from its periphery. The members 29 to 34 are so located that when a blank 9 is properly positioned inside the frame with its bottom side in contact with the lead members, each lead member is brought into juxtaposition with a metallized area, the end of the lead member lying on the hole in the metallized area. In practice, a piece of brazing metal (or solder) is placed on the tip of each lead member, the metallized blank is then positioned on top of the brazing metal, a weight is applied to the assembly and it is heated to effect brazing or soldering.

In a preferred embodiment of the invention, a cup 35 (FIG. 7C) is formed on the top of the ceramic base by placing a washer or ring 36 (FIG. 5B) of solder or brazing metal over the metallized area 24 on the upper face of the lobes, and then positioning an eyelet 37 on top of the washer 36. The eyelet 37 can be brazed to the base to form the cup 35 at the same time the leads are fixed.

After brazing or otherwise securing the eyelet 37 and leads 29 to 34 to the base, the leads may be severed from the frame 28 and the lobes 10 and 11 broken from the strut 12, to give two complete bases 38 and 39 (FIGS. 7A–7B).

The invention will be further described with reference to the following specific example, which is given for purposes of illustration only and is not to be taken as in any way limiting the invention beyond the scope of the appended claims.

*Example*

A slip is made by mixing 445 parts by weight ceramic powder comprising 2.82% MnO, 2.74% $SiO_2$, 0.20% CaO, 0.50% MgO and the balance substantially all $Al_2O_3$ with 18.2 parts of wax, about 0.1 part of tannic acid, 1.35 parts of sodium silicate and 180 parts of water. After milling, the slip is spray dried and the resulting powder is mixed with 1% zinc stearate and pressed into tiny ceramic blanks having a shape shown in FIGS. 2–4 of the drawing. In a typical case, the diameter of the lobes is 0.186″, the width of the strut is 0.066″, the overall length is 0.425″ and the thickness is about .010″. These blanks are then fired in a tunnel kiln having a maximum temperature of about 2725° F., the total firing time being 36 hours. The blanks are then ground and cleaned. They are then coated in an automatic silk screen machine with a finely divided mixture comprising 76.5% Mo, 19.5% Mn and 4.0% Ti in a pine oil (N.F. XI) vehicle. Other conventional silk screen vehicles may be used, as for example, Du Pont V–496 or a mixture of say 1% ethyl cellulose dissolved in diethylene glycol monobutyl ether acetate. The screening is arranged to apply the pattern shown in FIGS. 4A–4B of the drawing. The coated blanks are next fired at about 2600° F. in a reducing atmosphere (25% $H_2$–75%$N_2$) for up to 1 hour. After cooling, the coated blanks are nickel or copper plated.

A carbon jig made to receive a lead frame such as 28 is then used to assemble the base. A copper or nickel frame shaped as the element 28 in FIG. 5 is put into the jig. Two brazing metal washers designed to make contact with the tips of the leads on each side of the frame are then positioned over the leads. The blank is then lowered bottom face down on top of the washer. Other brazing washers designed to contact the outer metallized rim of the blank lobes are brought into position. Eyelets are placed over these last washers, the whole assembly is weighted and fired at say 1650° F. to effect flow of the brazing metal. After about 2 hours at firing temperature, the frame with attached bases is removed from the jig, the leads are snipped off at the frame and the lobes are broken off from the strut to give two completed bases.

For reasons of simplicity and economy the dumbbell shaped blank described above and shown in the drawing is preferred. It is obvious however, that the web to which the lobes are attached may take more complex forms than the simple strut described. For example six, ten, twelve or more lobes may be formed in a rectangular array on a spine-like central web; or may be grouped in a more or less circular pattern about a star shaped web, all without departing from the broad invention.

What is claimed is:

1. A method for making miniature ceramic bases for electrical circuit elements which comprises pressing a raw ceramic mix into a blank, said blank comprising two lobes, each corresponding to one base, and a strut connecting said lobes, applying metal coatings to selected areas of said lobes to form, on each of said lobes, discrete, insulatedly separate, metallized areas all surrounded by a peripheral metallized area, attaching leads to said insulatedly separate metallized areas, fixing eyelets to said peripheral areas to form cups for receiving electrical circuit elements and detaching said lobes from said strut.

2. A method for making miniature ceramic bases for electrical circuit elements which comprises pressing a raw ceramic mix into a blank, said blank comprising two lobes, each corresponding to one base, and a strut connecting said lobes, using said strut as an indexing means for subsequent operations, applying metal coatings to selected areas of said lobes to form, on each of said lobes discrete, insulatedly separate, metallized areas all surrounded by a peripheral metallized area, and attaching leads to said insulatedly separate metallized areas.

References Cited

UNITED STATES PATENTS

| | | | |
|---|---|---|---|
| 2,985,806 | 5/1961 | McMahon. | |
| 3,187,240 | 6/1965 | Clark | 29—155.5 X |
| 3,193,418 | 7/1965 | Cooper. | |
| 3,195,225 | 7/1965 | Belliveau | 29—413 X |
| 658,598 | 9/1900 | Stevens. | |

WILLIAM I. BROOKS, *Primary Examiner.*